Oct. 28, 1969  O. BIHLMAIER ET AL  3,474,714
CAMERA FOR EXPOSING DIFFERENT TYPES OF FILM PACKAGES
Filed July 13, 1965  4 Sheets-Sheet 1

Oct. 28, 1969　　O. BIHLMAIER ET AL　　3,474,714
CAMERA FOR EXPOSING DIFFERENT TYPES OF FILM PACKAGES
Filed July 13, 1965　　4 Sheets-Sheet 3

Oct. 28, 1969  O. BIHLMAIER ET AL  3,474,714
CAMERA FOR EXPOSING DIFFERENT TYPES OF FILM PACKAGES
Filed July 13, 1965  4 Sheets-Sheet 4

United States Patent Office 3,474,714
Patented Oct. 28, 1969

3,474,714
CAMERA FOR EXPOSING DIFFERENT TYPES OF FILM PACKAGES
Oskar Bihlmaier, Paul Greger, and Erwin Doring, Braunschweig, Germany, assignors to Voigtlander A.G., Braunschweig, Germany, a corporation of Germany
Filed July 13, 1965, Ser. No. 471,511
Claims priority, application Germany, July 18, 1964, V 26,382
Int. Cl. G03b *19/04*
U.S. Cl. 95—31                                    10 Claims

ABSTRACT OF THE DISCLOSURE

A camera for coacting with a cassette selected from a plurality of cassettes. The camera includes a permanent subassembly which has at least an objective and a viewfinder, and a cassette means is removably connected with the permanent subassembly and forms a complete camera therewith, this cassette means being selected from a plurality of cassette means which respectively house different types of film packages and which are interchangeably connectable with the subassembly with each cassette means capable of forming a complete camera therewith, so that the same permanent subassembly can be used in connection with exposure of different types of film packages. The permanent subassembly has an adjustable means capable of being adjusted according to the speed of the film which is exposed and a plurality of cassette means respectively carry a plurality of film-speed means which are respectively indicative of the speeds of film in the plurality of cassette means, and each film-speed means, when the cassette means carrying the same is connected with the permanent subassembly, actuating the adjustable means to set the latter according to the speed of the film, so that the selected cassette means which is removably connected with the permanent subassembly coacts therewith for setting the adjustable means to the speed of the film in the selected cassette means.

---

The present invention relates to cameras.

At the present time it is customary for unexposed film to be marketed in different types of film packages. For example, one type of well-known film package includes a cartridge in which a film-supply spool is supported for rotary movement so that during exposure the film is unwound from the spool while being moved out of the cartridge, and after exposure the film is rewound back onto the spool within the cartridge which is then removed from the camera and suitably processed. Another type of film package supports the film in a coil which is not on any spool but which is instead situated in a suitable cartridge from which a leader portion of the film projects. This leader portion of the film is advanced into an identical but empty cartridge, and the configurations of the cartridges are such that the film automatically forms itself into a coil during movement into the cartridge. In this type of film package the unexposed film is completely transported out of one cartridge and into another cartridge, and it is from this latter cartridge that the exposed film is subsequently processed. A third well-known type of film package supplies the unexposed film in a suitable magazine having a pair of light-tight chambers between which the film is moved through a suitable guide which communicates with and interconnects these chambers of the magazine.

At the present time all cameras are designed so that they must be used with a particular type of film package. In other words, when the photographer uses a given camera he must use with that camera a particular type of film package. If the particular camera is designed to use, for example, the cartridge into which the film is rewound after it has been exposed, this particular camera cannot be used with a magazine-type of package or with the type of film package where the unsupported film coil is displaced completely out of one cartridge and into another cartridge. As a result, the photographer is greatly limited in the range of different types of film which he can purchase for exposure. When the photographer purchases film to be exposed he must be careful to purchase film which is packaged in such a way that it can be suitably handled by his camera. Otherwise the film will be useless unless of course the photographer possesses several different cameras which are designed for use with different types of film packages, respectively. Naturally the presence of several different cameras for this purpose involves a considerable expense and inconvenience.

It is accordingly a primary object of the present invention to provide a camera which makes it possible for a photographer to expose any type of film package with the one camera.

A further object of the present invention is to provide a camera which while capable of exposing different types of film packages nevertheless has a cost which is quite favorable when compared with that of a conventional camera.

Also, it is an object of the present invention to provide a camera capable of exposing different types of film packages with a minimum of inconvenience to the operator.

Also, it is an object of the present invention to provide a camera which can be manipulated in precisely the same way to advance film irrespective of the particular type of film package which is exposed.

The objects of the present invention also include a camera structure having a light meter which is adjustable according to the film speed and which can be adjusted irrespective of the particular type of film package which is exposed with the camera of the invention.

The invention is illustrated by way of example in the accompanying drawings which form part of the application and in which.

Figure 1:
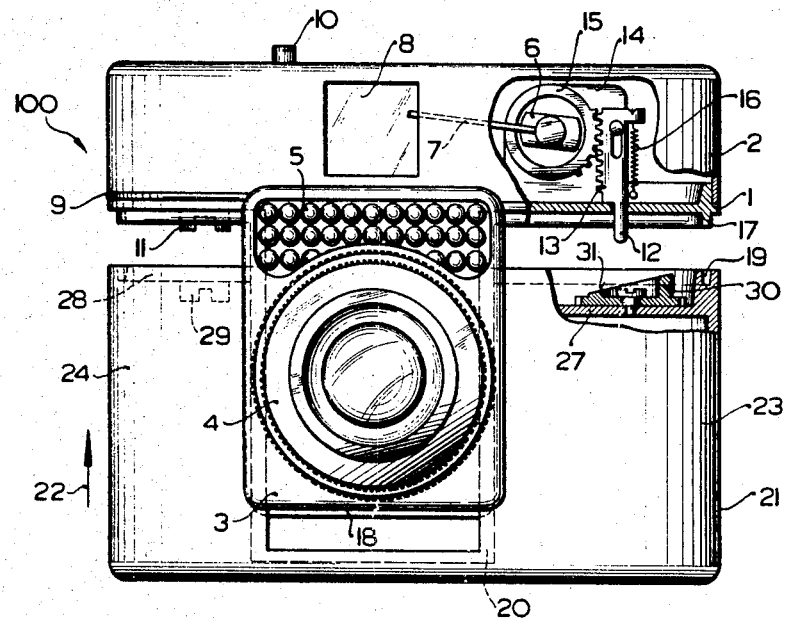
FIG. 1 shows in a partly sectional and partly schematic front elevation one possible embodiment of the camera according to the present invention, the structure being shown in FIG. 1 during connection of one of a plurality of interchangeable cassette means with a permanent subassembly of the camera.
Figure 2:
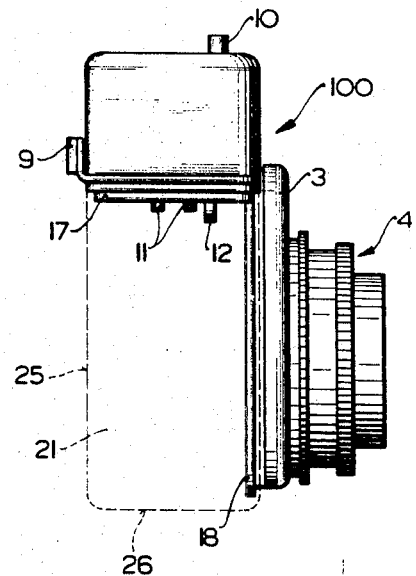
FIG. 2 is a side elevation of the permanent subassembly of the camera of FIG. 1, FIG. 2 showing in dotted lines the outline of each of the cassette means capable of being interchangeably connected with the permanent subassembly.
Figure 6:
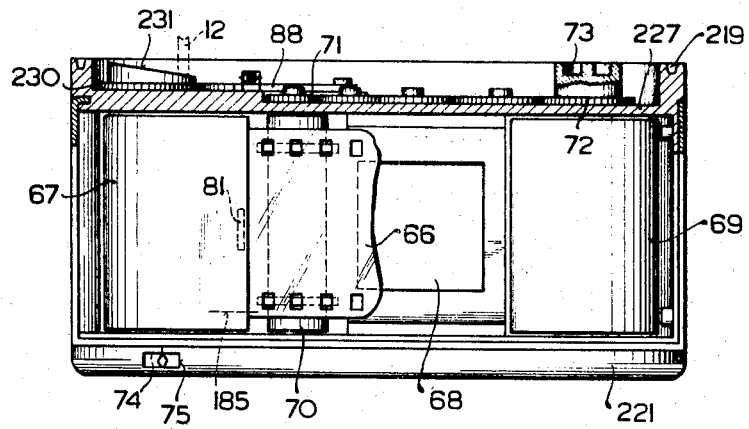
Figure 7:
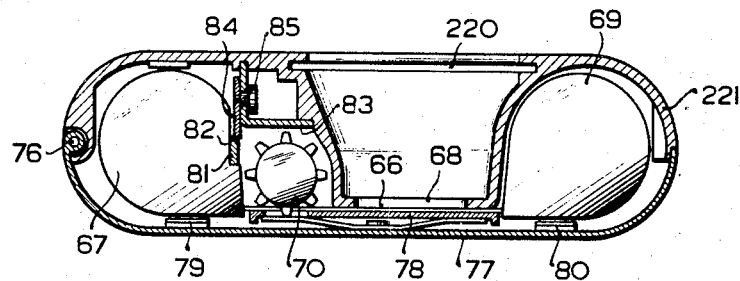
Figure 8:
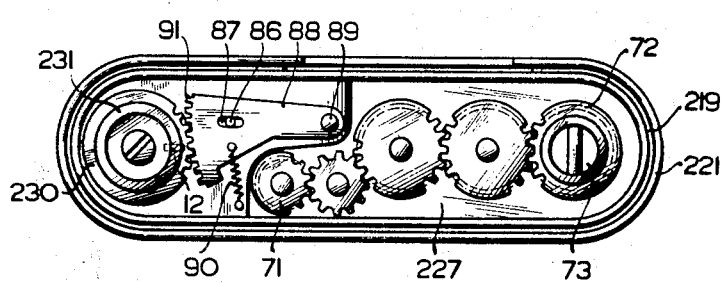
Figure 9:
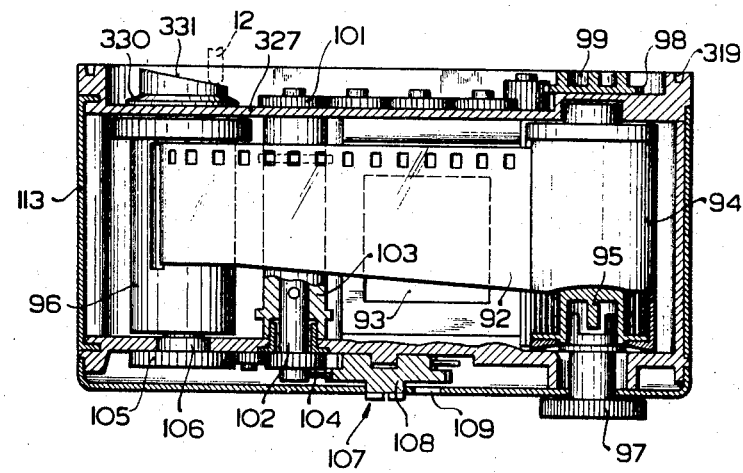
Figure 10:
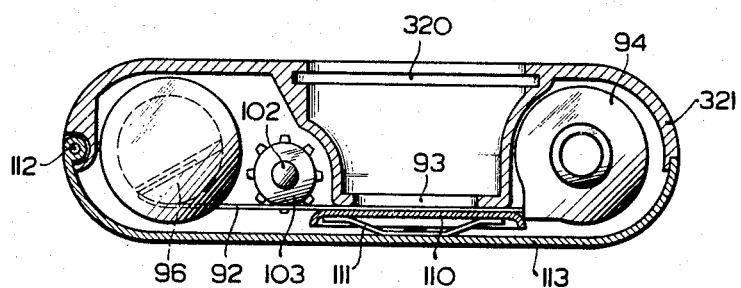
Figure 11:
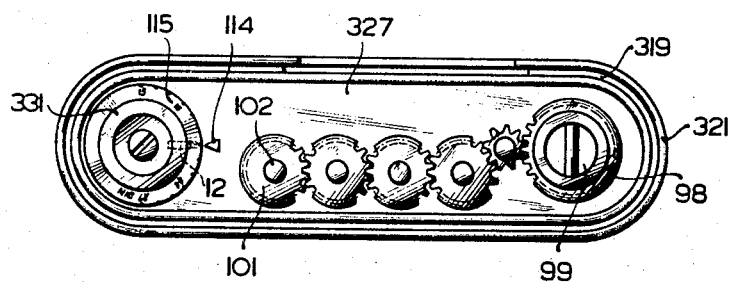

FIGS. 6–8 are respectively a partly sectional rear elevation, a sectional plan, and a top view of another cassette means capable of being connected with the permanent subassembly of FIGS. 1 and 2 and adapted to receive another type of film package; and FIGS. 9–11 are respectively a sectional rear elevation, a sectional plan, and a top plan view of a third casette means capable of being selectively connected with the permanent subassembly of FIGS. 1 and 2 and adapted to receive yet another type of film package.

Referring now to FIGS. 1 and 2, there is illustrated therein a permanent camera subassembly 100 which includes a mounting plate 1 which extends in a substantially horizontal plane when the camera is in its normal attitude of operation. A hollow enclosure 2 is mounted on the plate 1 to define therewith a chamber for receiving various units of the camera, among which are the viewfinder 8. An objective board 3 is fixed to and projects downwardly from the front edge of the mounting plate 1 in a plane substantially perpendicular thereto, and this objective board 3 removably carries in a known way an objective 4 which includes, in addition to the lenses and mountings therefor such structure as the shutter and diaphragm assemblies of the camera, as is well known. If desired, the shutter structure may remain permanently connected with the board 3 while the objective lenses may form an interchangeable unit capable of being exchanged for other objectives. The objective board 3 also carries a light-sensitive cell 5 which forms part of a light-measuring means which includes the measuring unit 6 in the form of a moving coil assembly, such as a galvanometer, provided with a pointer 7 which turns with the rotor and which has a free end visible in the viewfinder 8, although, if desired, the pointer 7 can be reflected into the viewfinder to have its image seen by the operator of the camera.

In the illustrated example the mounting plate 1 also carries a manually operable film-advancing means 9 which includes a lever accessible to the operator and capable of being turned through a given stroke so as to advance the film by one film frame. The turnable lever 9 is releasably retained in a rest position by a spring which returns the lever 9 to the rest position after it has been actuated by the operator, and the lever 9 is operatively connected with a suitable drive which serves in a well-known manner to cock the shutter simultaneously with the advancing of the film to situate the next unexposed frame in a position to be exposed. The cocked shutter is released by depression of a shutter-release plunger 10 which projects above the enclosure 2, through an opening in the top wall thereof, and this shutter-release plunger 10 in a well-known manner releases the shutter to make the exposure so that thereafter during the next actuation of the lever 9 to advance the film the shutter will again be cocked.

The mounting plate 1 has an underside at which part of a transmission which is actuated by the lever 9 is exposed, and this part of the transmission is in the form of a rotary spool key 11 which turns through a given angle about its axis during each actuation of the lever 9, this lever 9 being connected to the spool key 11 through a well-known one-way drive. The mounting plate 1 is also formed with an opening through which a transmission member 12 freely projects downwardly beyond the underside of the mounting plate 1, and this transmission member 12 is in the form of a sensing member capable of sensing the position of an adjustable member which is adjusted according to the speed of the film which is exposed. This sensing member 12 has a rack portion 13 which meshes with a rotary pinion 15 supported for rotation by a suitable bracket 14 carried by the mounting plate 1 within the enclosure 2, and the rotary pinion 15 carries the entire instrument 6 so that the angular position of the latter is preset in accordance with the film speed. For example, the housing of the instrument 6 can be mounted directly on the rotary pinion 15 to be initially placed in a predetermined angular position which will of course influence the position of the pointer 7 in accordance with the particular speed of the film which is to be exposed. A spring 16 is operatively connected to the sensing member 12 for urging the latter to the position illustrated in FIG. 1 which is a lowermost end position for the sensing member 12, and the adjusting means carried by the particular interchangeable cassette which is connected with the permanent subassembly 100 will place the member 12 at an elevation which will be in accordance with the film speed and which will thus place the instrument 6 at an initial angular position which will properly intttroduce the factor of the film speed into the camera. The permanent subassembly 100 of the camera includes a part 17 of a coupling structure whose complementary part is carried by each of the interchangeable cassettes, so that with this coupling structure a light-tight connection can be provided between the permanent subassembly and each of the cassette means. The coupling structure part 17 is in the form of a rib which projects downwardly from the underside of the mounting plate 1, which is integral with the latter, and which is situated just inside of and extends along the outer periphery of the mounting plate 1. The coupling structure further includes a similar rib 18 which extends along the bottom and both sides of the objective board 3 at the rear of the latter.

All of the structure described above forms the permanent subassembly 100 of the camera of the invention. Irrespective of the type of film package which is to be exposed, the same subassembly 100 of the camera of the invention will be used so that this subassembly is indeed permanent in the sense that it is always used irrespective of the particular type of film package which is being exposed at any given time.

The complementary coupling structure part which cooperates with the part formed by the ribs 17 and 18 takes the form of grooves 19 and 20, respectively, formed in edge portions of walls of an interchangeable cassette means 21 capable of being connected with the permanent subassembly 100 so as to form a complete camera therewith. During connection of the cassette means 21 with the subassembly 100, the rib 18 is first introduced into the parallel opposed vertical portions of the substantially U-shaped groove 20 so that these vertical portions of the groove 20 guide the rib 18 and the permanent subassembly 100 therewith during connection of the cassette means 21 to the subassembly 100. The cassette means 21 is moved in the direction of the arrow 22 (FIG. 1) with respect to the subassembly 100 during connection of the cassette means 21 thereto. This movement is continued until the rib 17 is received in the groove 19 which of course has a configuration matching that of the rib 17. Through the complete filling of the grooves 19 and 20 by the ribs 17 and 18, a light-tight mechanical connection between the cassette means 21 and the subassembly 100 is provided, and any suitable known releasable locking structure can be provided to reliably maintain the cassette means 21 and the subassembly 100 releasably interconnected with each other.

The cassette means 21 has a pair of front wall portions 23 and 24 which project in different directions laterally beyond the objective board 3, so as to form the front wall of the complete camera. Also, the cassette means 21 includes a rear wall 25 and a bottom wall 26, indicated in FIG. 2 where the outline of the cassette means 21 is indicated in dotted lines. It is to be noted that while in FIG. 1 the cassette means 21 is shown during its connection with the permanent subassembly 100, in FIG. 2 the cassette means 21 is indicated in its final position with respect to the subassembly 100. It is the cassette means 21 which holds the unexposed film, and the cassette means includes an upper wall 27 having a topside directed toward the underside of the mounting plate 1. The wall 27 supports for rotation an intermediate member 28 which has a configuration mating that of the rotary spool key 11. Thus, when the cassette means 21 is connected with the permanent subassembly 100, the projections of the key 11 will be received in recesses of the rotary member 28 having the same configuration as these projections, so that when the key 11 turns in response to actuation of the lever 9 the rotary member 28 will also turn. This rotary member 28 fixedly carries at its underside a motion-transmitting member 29 which turns with the rotary member 28 and which cooperates with a rotary film spool situated within the cassette 21, so that in this way the film spool will be turned in response to actuation of the lever 9.

The upper wall 27 of the cassette means also supports for rotary movement and adjusting member 30 in the form of a rotary cam having an upper camming edge 31 engaged by the bottom end of the sensing member 12 which is in the form of a motion-transmitting member transmitting to the pinion 15, through the rack 13, the angular position of the adjusting member 30. Thus, assuming that the adjusting member 30 has an angular position which is indicative of the film speed of the film which is within the cassette means 21, then this particular film speed will have its value transmitted to the light-measuring instrument 6. Thus, it will be seen that the permanent subassembly 100 carries an adjustable means, the light-measuring means in the illustrated example, capable of being adjusted in accordance with the film speed.

In the following figures are shown different embodiments of cassette means which are respectively designed to receive different types of film packages. However, all of these different cassette means have the same exterior configuration and include the above-described elements of the cassette means 21, except for special differences which may be specifically referred to below. Thus, any one of the cassette means described below will provide the dotted outline indicated in FIG. 2 and will be capable of being coupled with the film-transporting means 9 as well as actuating the sensing member 12 for setting the light-measuring structure according to the film speed. The several cassette means of the invention differ from each other in the manner in which they are constructed to cooperate with the different types of film packages.

Figure 3:
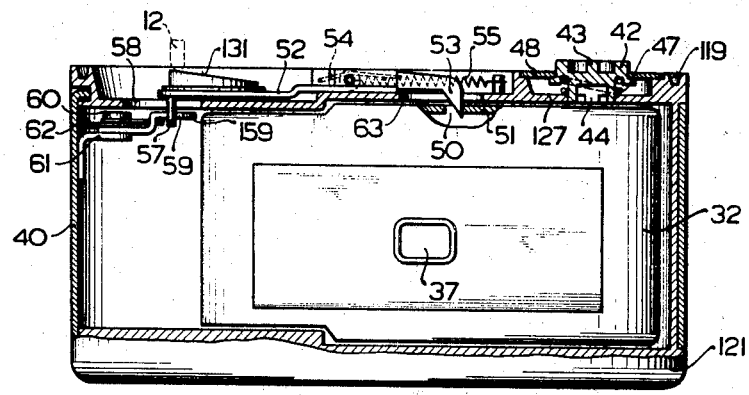
FIGS. 3–5 are respectively, a partly sectional rear elevation, a sectional plan, and a top plan view of one cassette means capable of being connected with the permanent subassembly of FIGS. 1 and 2, and designed to cooperate with one type of film package.
Figure 4:
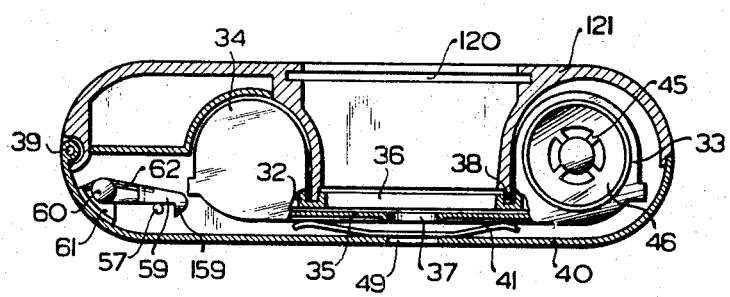
Figure 5:
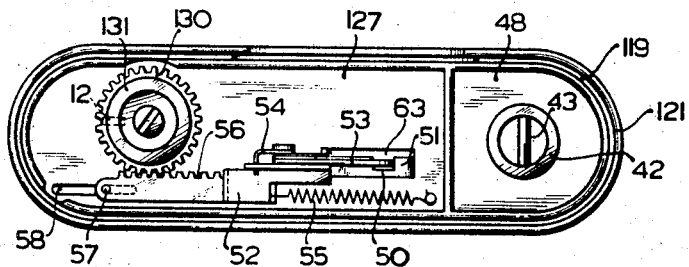

Referring now to FIGS. 3-5, there is illustrated therein a cassette means 121 which is constructed so as to be capable of receiving a film package in the form of a film magazine 32. The film magazine 32 includes a light-tight chamber 33 for the take-up spool 46 and a further light-tight chamber 34 which accommodates the supply spool. The chambers 33 and 34 are interconnected with and communicate with each other by way of a film guide formed by the portion 35 of the magazine, this portion 35 extending between and being connected with the chambers 33 and 34. This portion 35 is in the form of a pair of elongated walls which define between themselves a passage through which the film slides so as to be reliably guided by and maintained in the focal plane by the portion 35 of the magazine when this portion 35 is maintained in the position illustrated in FIG. 4. The front wall of the portion 35 of the magazine 32 is formed with an opening 36 through which the film is exposed, and the rear wall of the portion 35 is formed with a window 37 through which the rear surface of the protective paper which carries the film is visible. This rear surface of the protective paper can carry certain information such as the number of the film frame which is being exposed, or the like, and by viewing this number through the window 37 the operator can know which film frame is being exposed, for example. The cassette means 121 is provided around the window 36 with a rearwardly extending rib 38 which is received in a groove formed in a front face of the magazine 32, this groove completely surrounding the window 36 and the rib 38 being endless, so that in this way a labyrinth type of tongue and groove support for the magazine providing absolute light-tightness around the gate 36 is guaranteed. The cassette means 121 further includes a hinge 39 which serves to swingably connect to the cassette means its rear wall 40 in the form of a door which can be opened and closed, and the inner surface of the rear wall or door 40 of the cassette means 121 carries a leaf spring 41 which engages the rear of the magazine, after the latter has been introduced into the cassette means, and urges the magazine 32 forwardly to the position illustrated in FIG. 4. The rear door 40 of the cassette means 121 is releasably maintained in its closed position through any suitable releasable lock structure.

The cassette means 121 has a size and outer configuration corresponding to that of the cassette means 21 described above in connection with FIGS. 1 and 2, and the cassette means 121 is formed along its upper peripheral edge with a groove 119 identical with the groove 19 and receiving the rib 17 of the permanent subassembly 100, and in addition the cassette means 121 is formed with a groove 120 identical with the groove 20 and receiving the rib 18 of the permanent subassembly 100, so that the cassette means 121 is interchangeable with other cassette means, such as those described below, and can easily be connected to or removed from the permanent subassembly 100.

The cassette means 121 carries additional structure, described below, which cooperates with the spool key 11 of the subassembly 100 as well as with the sensing arm 12.

The upper wall 127 of the cassette means 121 supports for rotary movement a coupling member 42 (FIGS. 3 and 5) which on the one hand is formed with projections 43 defining recesses for receiving the projections of the key 11, so that when the cassette means 121 is joined to the subassembly 100 the spool key 11 will be connected with the rotary member 42 in order to transmit rotation thereto during actuation of the manually operable film-advancing lever 9. This rotary member 42 is provided at a lower portion with a substantially cylindrical recess for receiving the cylindrical top end of the rotary spool 46 light-tightly mounted in the chamber 33 of the magazine, and the take-up spool 46 of the magazine 32 is provided adjacent the upper cylindrical end of its spool shaft with notches 45 for respectively receiving projections 44 of the rotary member 42, so that in this way rotation of the rotary member 42 will be transmitted to the take-up spool 46. The coupling member 42 which thus couples the spool key 11 to the take-up spool 46 of the chamber 33 of the magazine 32 is surrounded by a compression spring 47 which urges the coupling member 42 upwardly to the position illustrated in FIG. 3. The rotary member 42 is provided with an outwardly directed flange engaging the underside of a plate 48 fixed to the upper right portion of the cassette means 121, as viewed in FIG. 3, and serving to close a recess in the upper wall 27, the spring 47 being housed within this recess which is closed by the plate 48. As a result of this arrangement when the cassette means 121 is not connected with the permanent subassembly 100, the rotary coupling member 42 will have the position illustrated in FIG. 3 where the bottom end portion of the rotary member 42 does not extend into the hollow interior space of the cassette means 121 which receives the magazine 32, so that when the rear door 40 of the cassette means is in its open position the magazine can be introduced and removed from the interior of the cassette means without any hindrance by the rotary coupling member 42. Only when the cassette means 121 is joined with the permanent subassembly 100 does the spool key 11 come into engagement with the coupling member 42 and not only become interlocked therewith to transmit rotation thereto but in addition depresses the coupling member 42 in opposition to the spring 47 so that the projections 44 will be received in the notches 45. The spool 46 will then be coupled to the film-advancing means carried by the permanent subassembly 100 so that at each actuation of the lever 9 by the operator the film will be advanced by one film frame.

The rear wall or door 40 of the cassette means is formed with a window 49 through which the window 37 at the rear of the magazine 32 is visible, so that any indicia printed on the rear exposed surface of the protective paper which carries the film can be seen through the aligned windows 49 and 37. Also, any additional information which is printed or otherwise carried by the rear surface of the magazine itself can be seen through the window 49.

The speed of the film which is in the magazine is indicated in a known way by a notch 50 which is situated at a location along the upper front edge of the front wall of the portion 35 of the magazine which is indicative of the particular film speed. In other words, the upper edge of the front wall of the portion 35 of the magazine, at a location over the window or gate 36 is formed with a notch 50 whose location between the chambers 33 and 34 is indicative of the film speed. The manner in which the upper front edge 51 of the magazine portion 35 is formed with the notch 50 is particularly apparent from FIGS. 3 and 5. It is to be noted that this upper front edge 51 extends in the direction of film movement. Referring to FIG. 3, film speeds different from that indicated in FIG. 3 would be indicated by a location of the notch 50 either to the right or to the left of the location thereof shown in FIG. 3. The particular location of the notch 50 is sensed by a structure which is now to be described, and this sensed position of the notch 50 is transmitted to the light meter carried by the permanent subassembly 100.

The upper wall 127 of the cassette means 121 supports for sliding movement, in a direction parallel to the edge 51, a slide member 52 which carries a sensing pawl 53. The pawl 53 is pivotally mounted on the right end portion of the slide member 52, as viewed in FIGS. 3 and 5, and a spring 54 cooperates with the slide 52 and the pawl 53 to urge the latter to turn in a clockwise direction, as viewed in FIG. 3, so that the tooth of the pawl tends to move downwardly, as viewed in FIG. 3. An elongated coil spring 55 is operatively connected to the slide member 52 so as to urge the latter to the right, as viewed in FIGS. 3 and 5, along the upper wall 127 of the cassette means 121. A portion of the slide member 52 is provided with teeth so as to form a rack 56, and this rack 56 meshes with a toothed portion of a rotary cam member 130. Thus, the rotary-adjusting member 130 has a gear portion meshing with the rack 56, and this rotary adjusting member 130 is provided along its upper annular edge with the camming edge configuration 131 which is identical with the camming edge 31 of the cam 30 of FIG. 1 and which is situated so as to cooperate in precisely the same way with the sensing member 12. Thus, when the cassette means 121 is connected to the permanent subassembly 100, the sensing arm 12 will engage the camming edge 131 and will set the instrument 6 so as to take into account the speed of the film which is in the magazine. In FIGS. 3 and 5 the manner in which the arm 12 cooperates with the camming edge 131 is indicated in dotted lines.

The slide member 52 carries a pin 57 which extends through an elongated slot 58 which is formed in the upper wall 127 of the cassette means 121. This pin 57 extends into the path of movement of a pawl 59 situated in the interior of the cassette means 121. This pawl 59 is supported for pivotal movement by a pivot pin 60 carried by a bracket 61 which is fixed to the rear door 40 of the cassette means 121 at the interior of the latter. A spring 62 acts on the pawl 59 so as to urge the latter in a clockwise direction, as viewed in FIG. 4, thus maintaining the pawl in engagement with the pin 57 which projects downwardly from the slide member 52.

When the rear door 40 of the cassette means 121 is opened, the bracket 61 and thus the pivot pin 60 therewith is swung about the hinge 39 in a clockwise direction, as viewed in FIG. 4, and as a result the pawl 59 by remaining in engagement with the pin 57 turns in a counterclockwise direction about the pin 60, as viewed in FIG. 4. In addition the pawl 59 is of course pulled to the left, as viewed in FIG. 4, so that it shifts to the left with respect to the pin 57 until the tooth 159 of the pawl 59 engages the pin 57 and then moves the latter together with the slide member 52 in opposition to the spring 55 to the left, as viewed in FIGS. 3 and 5. As a result, the tooth of the pawl 53 which is in the notch 50 is drawn out of the notch 50 and slides along the upper edge 51 of the magazine to the left. This tooth will finally reach the left end of the opening 63 of the top wall 127 through which the tooth of the pawl 53 projects, and the pawl will then slide to a slight extent the the left beyond the opening 63 when the door 40 has been opened to an extent sufficient to permit the magazine to be removed from the interior of the cassette means 121. In this way the pawl 53 is displaced away from the edge 51 of the magazine 32.

When the rear door 40 of the cassette means is returned to its closed position, the above procedures are reversed. The pawl 53 then falls through the opening 63 onto the top edge 51 of the magazine 32, and moves along this top edge until it reaches the notch 50 whose position along the edge 51 is of course indicative of the speed of the film within the magazine, so that the angular position of the adjusting member 130 will be determined by the film speed, and thus the light-meter means carried by the permanent subassembly 100 will be properly preset in accordance with the film speed.

It is therefore apparent that the cassette means 121 shown in FIGS. 3–5 can be releasably united with the permanent subassembly 100 to form a completely operative photographic camera therewith.

FIGS. 6–8 illustrate a cassette means 221 which also can be connected with the permanent subassembly 100 so as to form a complete camera therewith.

As may be seen from FIGS. 6–8, the cassette means 221 is designed so as to be capable of receiving a film package in the form of a cartridge 67 which houses, in a light-tight manner, a coil of film 66 which is not supported on any rotary spool within the cartridge 67. The coil of film is automatically formed during introduction of the film strip into the cartridge 67, and this behavior of the film is well known and forms no part of the present invention. In other words, the film package of FIGS. 6–8 is a well-known type of film package which forms no part of the present invention. The film strip 66, during exposure, advances past the film gate 68 of the cassette means 221, and it is fed directly into a cartridge 69 identical with the cartridge 67 so that as the film 66 is pushed into the carriage 69, the exposed film will automatically form a coil within the cartridge 69. Thereafter the cartridge 69 with the exposed film therein is removed from the cassette means 221 so that the exposed film can then be processed. Inasmuch as the cartridges 67 and 69 are identical, the now empty cartridge 67 can be shifted to the position of the cartridge 69 so as to replace the latter, and another cartridge with unexposed film is introduced into the cassette means 221 so as to take the position of the cartridge 67 illustrated therein. Of course, initially a leader portion of the film strip 66 projects from the new cartridge with the unexposed film therein.

A rotary sprocket shaft 70 has sprocket teeth which enter into the perforations of the film 66 so as to advance the latter in response to rotation of the shaft 70. The upper end of the shaft 70 projects above the upper surface of the upper wall 227 of the cassette means 221, and to this upper end of the shaft 70 is fixed a gear 71 which through the gear train shown in FIGS. 6 and 8 is operatively connected with the teeth of a gear 72 supported for rotary movement by the upper wall 227 and provided with the recesses 73 which have a configuration matching the projections of the spool key 11 so that in this way a dog-clutch type of connection is made between the key 11 and the rotary member 73 for transmitting rotation between the manually operable film-advancing lever 9 and the gear 72. Thus, when the cassette means 221 is united with the permanent subassembly 100 to form a complete camera therewith, the spool key 11 will be received in the complementary clutch member 73 so as to transmit the film-advancing movement of the lever 9 to the rotary film-advancing sprocket shaft 70. The bottom wall of the cassette means 221 carries a film counter connected to the shaft 70 so as to be actuated thereby in a known way, and this counter includes a counting disc 74 which is visible through a window 75 of the cassette means 221.

This cassette means 221 is also provided with an endless upper peripheral groove 219 which is complementary with and receives the rib 17, and in addition the cassette means 221 has a groove 220 identical with the groove 20 of FIG. 1 and receiving the rib 18 of the permanent subassembly 100.

The cassette means 221 has at its left side, as viewed in FIG. 7, a vertically extending hinge 76 which serves to pivotally connect to the cassette means its rear wall or door 77. Resiliently mounted on the inner surface of the door 77 is a pressure plate 78 which engages the film strip 66 and maintains it in the focal plane as it is advanced past and remains at the film gate 68. On both sides of the pressure plate 78 the rear wall or door 77 carries a pair of leaf springs 79 and 80 which respectively press against the cartridges 67 and 69 when the door 77 is closed, so as to reliably maintain the cartridges 67 and 69 in the proper positions thereof indicated in FIG. 7.

The speed of the film which is in the cartridge 67 is in a known way indicated by a stop member 81 mounted on the cartridge 67 at the exterior thereof. The location of the front edge 82 of the stop member 81 is indicative of the film speed. With respect to FIG. 7, a film speed different from that indicated in FIG. 7 would result in a location of the front edge 82 either higher or lower than the location thereof shown in FIG. 7. In order to sense the particular position of the front edge 82 of the stop member 81, an intermediate wall 83 pivotally supports a sensing lever 84 by way of a pivot pin 85 carried by the wall 83. The pivot pin 85 carried by the interior wall 83 provides for the sensing lever 84 a turning axis 185 whose position in elevation is indicated by a dotted line in FIG. 6. The lever 84 terminates at its top end in a pin portion 86 (FIG. 8), and this pin portion 86 at the free end of the lever 84 projects through an opening in the upper wall 227 of the cassette means 221 into a slot 87 which is formed in a gear sector 88 supported for turning movement by a pivot pin 89 fixedly carried by the upper wall 227 at its topside. This toothed lever or gear sector 88 is acted upon by a spring 90 which seeks to turn the sector 88 in a counterclockwise direction, as viewed in FIG. 8. As a result the sensing lever 84 is urged toward the front edge 82 of the stop member 81 and is maintained in engagement with this front edge 82. Therefore, the gear sector 88 will assume an angular position determined by the location of the front edge 82 of the stop member 81. The teeth 91 of the gear sector 88 mesh with a gear portion of a rotary adjusting member 230 having an upper camming edge 231 identical with the camming edge 31 of the adjusting member 30 described above in connection with FIG. 1, and therefore this adjusting member 230 will be automatically placed in a position determined by the film speed. The sensing arm 12 cooperates with the camming edge 231 in the manner indicated in dotted lines in FIGS. 6 and 8, so that in this way the light-meter means of the permanent subassembly 100 is automatically preset according to the film speed. Inasmuch as the rotary adjusting members 130 and 230 with their camming edges 131 and 231 are identical, it is clear that irrespective of whether the operator chooses to connect to the cassette means 121 or the cassette means 221 to the permanent subassembly 100, the arm 12 will automatically be positioned with either of these cassette means when connected to the subassembly 100 in a position which will be determined by the particular speed of the film which is exposed.

Thus, it is clear that the cassette means 221 also can be connected with the permanent subassembly 100 so as to form a complete and fully operative camera therewith.

FIGS. 9–11 illustrate a third cassette means which is designed to receive another type of film package. This cassette means 321 is designed to receive a film package in which the film strip 92 is exposed through a film gate 93 of the cassette means 321. The film strip 92 is derived from the light-tight cartridge 94 which supports for rotation a supply spool 95 on which the unexposed film 92 is initially wound. With this type of film package the film 92, after it has been exposed, is rewound onto the spool 95 within the cartridge 94 which is then removed so as to enable the exposed film to be processed. In order to rewind the exposed film back onto the supply spool 95 within the cartridge 94, the cassette means 321 is provided at its bottom wall with a manually turnable rotary knob or disc 97 connected with the spool 95 in such a way that when the member 97 is raised to the position shown in FIG. 9 and is turned by the operator the spool 95 can be turned so as to have the exposed film rewound thereon. The operator can pull the rotary member 97 downwardly from the elevation thereof shown in FIG. 9, so that in this way the upper portion of the shank of the film-rewinding member 97 can be displaced downwardly from the interior space of the cassette means 321 which receives the cartridge 94, and in this way the cartridge can be introduced into and removed from the cassette means 321 without any hindrance from the rewinding member 97. After the cartridge 94 is within the cassette means 321 the member 97 can be pushed upwardly to the position shown in FIG. 9 so as to provide an operative connection between the spool 95 and the manually turnable member 97. Of course, once the film is rewound the member 97 is again pulled down to its position where it will release the cartridge 94 for removal from the cassette means 321.

In the same way as with the other cassette means of the invention, the cassette means 321 is provided along its upper periphery with an endless groove 319 which is complementary to and receives the endless rib 17, and at its front portion the cassette means 321 is formed with the groove 320 identical with the groove 20 and receiving in the same way the rib 18 of the permanent subassembly 100.

The cassette means 321 has an upper wall 327 which supports for rotary movement a gear 98 having a clutch portion 99 complementary to and mating with the clutch 11 so that when the cassette means 321 is connected with the permanent subassembly 100 the spool key 11 will be in driving engagement with the rotary gear 98 which will of course turn whenever the operator actuates the manually operable film-advancing lever 9. The gear 98 has its rotation transmitted through the gear train as shown in FIGS. 9 and 11 to a gear 101 which is fixed to the top end of a shaft 102 which extends through and fixedly carries the film-advancing sprocket member 103 whose teeth extend into the perforations of the film 92. The bottom end of the shaft 102 is fixed with a gear 104 which through intermediate gearing has its rotation transmitted to a gear 105 which is fixed to a rotary shaft 106 which extends through and is operatively connected, through a suitable slip clutch, with the take-up spool 96 supported for rotation by the cassette means 321 in the interior thereof. The slip-clutch connection between the shaft 106 and the spool 96 is well known in the art. On the other hand, the gear 104 is also operatively connected with a film counting mechanism 107, and whenever the film strip 92 is advanced by a distance of one film frame, the mechanism 107 turns the counter disc 108 so that a number of the scale carried thereby is visible through a window 109 in order to indicate to the operator which frame is in a position to be exposed. As is apparent from FIG. 10, the film 92 is maintained in the focal plane, in the region of the film gate 93, by a pressure plate 110. This pressure plate 110 is carried by a leaf spring 111 which is mounted on the inner surface of the rear door 113 of the cassette means 321, this rear door being hingedly connected to the remainder of the cassette means by a hinge 112.

In order to adjust the position of the sensing arm 12 of the permanent subassembly 100, the cassette means 321 rotatably carries at the top side of its upper wall 327 the adjusting member or cam 330 having the upper camming edge 331 identical with the camming edges 31, 131, and 231 referred to above. Thus, as is indicated in FIGS. 9 and 11, the arm 12, shown in dotted lines in FIGS. 9 and 11, can cooperate with the camming edge 331 in precisely the same way as with the camming edges of the adjusting members of the other cassette means, so that the light-meter means of the permanent subassembly 100 can be preset according to the film speed. With the type of film package which is received by the cassette means 321, however, there is neither on the cartridge 94 or on the spool 95 any structure which is indicative of the film speed, so that in this case the adjusting member 330 is adjusted by hand. For this purpose the topside of the upper wall 327 is provided with a stationary index 114 (FIG. 11) which cooperates with the graduations of a film speed scale 115 carried by a peripheral portion of the rotary adjusting member 330 and visible to the operator before the cassette means 321 is connected with the permanent subassembly 100. Therefore, the operator can manually set the adjusting member 330 so that its camming edge 331 will properly position the sensing arm 12. It is therefore apparent that the cassette means 321 also can be interchangeably connected with the permanent subassembly 100 to form a complete, fully operative camera therewith.

The connection between the turntable lever 9 (FIGS. 1 and 2) and the spool key 11 as well as between this lever 9 and the drive for cocking and releasing the shutter may, for example, be constructed as shown in FIGS. 3–5 of U.S. Patent 2,245,213.

The structure for releasably locking the subassembly 100 (FIGS. 1 and 2) to any of the interchangeable cassettes 21, 121, 221, or 321 may, for example, take the form shown for parts 30–33 in FIG. 4 of U.S. Patent 2,927,518.

Furthermore, FIGS. 1 and 3 of U.S. Patent 2,257,424 show a suitable locking device 23 which may, for example, be used for releasably locking the rear door of the cassettes 21, 121, 221, and 321.

Finally, U.S. Patent 3,057,277 shown in FIGS. 2 and 3 a suitable structure which may, for example, be used in the cassette 221 (FIGS. 6–8) for actuating the counting disc 74 from the shaft 70.

While specific embodiments of the invention have been shown and described in detail to illustrate the application of the principles of the invention, it will be understood that the invention may be embodied otherwise without departing from such principles.

What is claimed is:

1. A camera comprising a permanent subassembly including at least an objective and a viewfinder, and a cassette means removably connected with said permanent subassembly and forming a complete camera therewith, said cassette means housing one type of film package to be exposed by the camera and being selected from a plurality of cassette means which respectively house different types of film packages and each of which can be connected with said permanent subassembly to form a complete camera therewith, so that when the selected cassette means is removed from said permanent subassembly another cassette means can be connected therewith to form a complete camera, whereby the same permanent subassembly can be used in connection with the exposure of different types of film packages, said permanent subassembly including an adjustable means capable of being adjusted according to the speed of the film which is exposed, and said plurality of cassette means respectively carrying a plurality of film-speed means which are respectively indicative of the speeds of the film in said plurality of cassette means, and each film-speed means, when the cassette means carrying the same is connected with said permanent subassembly, actuating said adjustable means to set the latter according to the particular speed of the film in the selected cassette means, so that said selected cassette means which is removably connected with said permanent subassembly actuates said adjustable means, by the film-speed means carried by said selected cassette means, to set said adjustable means according to the particular speed of the film in the selected cassette means.

2. A camera as recited in claim 1 and wherein said permanent subassembly includes a mounting plate having an underside directed toward a topside of each cassette means when the latter is connected with said subassembly, said subassembly carrying a manually operable film-advancing means having a part exposed at said underside of said mounting plate and said subassembly also carrying an adjustable means adjustable in accordance with the speed of the film which is exposed, said adjustable means also having a part which is situated at said underside of said mounting plate, and each cassette means carrying at its top side a transmission means which becomes operatively connected to said part of said film-advancing means and a film-speed means which becomes operatively connected with said part of said adjustable means when the selected cassette means is attached to said subassembly, so that manipulation of the film-advancing means will advance film in the selected cassette means and so that said adjustable means will be set in accordance with the speed of the film within the selected cassette means.

3. A camera as recited in claim 2 and wherein said part of said film-advancing means is a rotary film-spool key, and said transmission means of each cassette means including a driven element complementary to and receiving said key to be rotated in response to turning movement thereof.

4. A camera as recited in claim 1 and wherein said permanent subassembly includes adjustable light-meter means and a mounting plate situated beneath said adjustable light-meter means and having an underside directed toward a topside of the selected cassette means which is connected with said subassembly, said mounting plate being formed with an opening and said light-meter means including a movable transmission member extending through said opening beyond said underside of said mounting plate and presetting said light-meter means for film speed according to the position of said transmission member, each cassette means carrying at its topside an adjusting element having a position determined by the speed of the film within the selected cassette means and said adjusting element engaging said transmission member when a selected cassette means is attached to said subassembly for displacing said transmission member to a position which will preset said light-meter means according to the speed of the film which is to be exposed.

5. A camera as recited in claim 4 and wherein said adjustable member carried by said topside of each cassette means is in the form of a rotary cam member having an upper camming surface engaged by said transmission member for determining the position thereof.

6. A camera as recited in claim 5 and wherein said adjustable cam member is manually turnable to a position in accordance with the film speed, said topside of each cassette means carrying a film speed scale for setting said adjustable member.

7. A camera as recited in claim 5 and wherein one of said cassette means is adapted to receive a film package formed with a notch whose position is indicative of the film speed, said one cassette means having a gear portion connected to the rotary adjustable cam member carried by its topside and supporting for movement in the direction of film movement a rack which meshes with said gear portion, said rack carrying a pawl which by entering the notch of a film package determines the position of said rack and gear portion so as to automatically determine the position of said adjustable member.

8. A camera as recited in claim 5 and wherein one of said cassette means is adapted to receive a film package in the form of a film-containing cartridge provided at its exterior with a stop member whose position is indicative of the film speed, said one cassette means carrying a lever for engaging said stop member so that said lever assumes a position indicative of the film speed, a rotary gear sector operatively connected with said lever to be turned thereby to a position indicative of the film speed, and a gear portion forming part of said rotary adjustable member and meshing with said gear sector so that said cam is automatically adjusted in accordance with the film speed.

9. A camera comprising a permanent subassembly including at least an objective and a viewfinder, and a cassette means removably connected with said permanent subassembly and forming a complete camera therewith, said cassette means housing one type of film package to be exposed by the camera and being selected from a plurality of cassette means for respectively housing different types of film packages, one of said cassette means being adapted to receive a film package in the form of a magazine having light-tight chambers between which a film strip is moved, another of said cassette means being adapted to receive a film package in the form of a cartridge from which a film coil, which is not supported by a spool, is unwound while being introduced into an identical take-up cartridge, and a third one of said cassette means being adapted to receive a film package in the form of a cartridge supporting in its interior a supply spool from which film is unwound during exposure of the film and onto which film is rewound after exposure of the film, so that the camera can be used for exposing any one of said types of film packages simply by attaching to said permanent subassembly a particular selected cassette means suited for the particular film package, said permanent subassembly including a light-meter means and a manually operable film-advancing means, each of said cassette means including means for adjusting said light-meter means according to the speed of the film in said cassette means and means for transmitting movement of said film advancing means to film within the selected cassette means which is removably connected with the permanent subassembly.

10. In a photographic camera for use with film cartridges of the type having an adjusting portion whose position with reference to the remainder of the cartridge is indicative of the sensitivity of the film therein, a housing defining a film chamber and a second chamber adjacent to said film chamber, said housing comprising wall means fully surrounding said second chamber and including a transverse wall between said chambers; a closure movable with reference to said housing between sealing and open positions to respectively prevent entry of light into and to expose said film chamber for insertion or removal of a film cartridge; an exposure meter carried by said housing outside of said chambers and including a movable part operative to effect different initial settings of the exposure meter so as to account for various film sensitivities; a movable sensing element extending through an aperture provided in said transverse wall and into the path of the adjusting portion on a cartridge which is being inserted into said film chamber; and a motion transmitting connection between said sensing element and said movable part to select the initial setting of said exposure meter in response to displacement of said sensing element by the adjusting portion of the cartridge in said film chamber, said connection comprising a turntable member mounted in said wall means and directly coupled with said sensing element.

References Cited

UNITED STATES PATENTS

| | | | |
|---|---|---|---|
| 2,367,195 | 1/1945 | Bolsey | 95—31 |
| 2,911,894 | 11/1959 | Hennig et al. | 95—31 XR |
| 2,924,158 | 2/1960 | Kopp et al. | 95—31 |
| 2,927,518 | 3/1960 | Dorr | 95—31 |
| 3,260,183 | 7/1966 | Winkler et al. | 95—31 |
| 3,266,397 | 8/1966 | Kremp et al. | 95—10 XR |

NORTON ANSHER, Primary Examiner

J. F. PETERS, JR., Assistant Examiner

U.S. Cl. X.R.

352—72